(12) United States Patent
Peters et al.

(10) Patent No.: US 7,764,779 B2
(45) Date of Patent: Jul. 27, 2010

(54) SIP ACD MULTI-TENANT MECHANISM THAT FACILITATES MULTIPLE LEVELS OF PARTITIONS OR TENANTS

(75) Inventors: Michael Peters, Downer's Grove, IL (US); Mike Hollatz, Huntley, IL (US)

(73) Assignee: Aspect Software, Inc., Lombard, IL (US)

( * ) Notice: Subject to any disclaimer, the term of this patent is extended or adjusted under 35 U.S.C. 154(b) by 1152 days.

(21) Appl. No.: 11/124,644

(22) Filed: May 6, 2005

(65) Prior Publication Data

US 2006/0251236 A1  Nov. 9, 2006

(51) Int. Cl.
*H04M 3/00* (2006.01)
(52) U.S. Cl. .............................. 379/265.01; 379/265.02
(58) Field of Classification Search ..................
379/265.01–265.14, 266.01–266.1, 309; 370/352
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,335,927 B1 | 1/2002 | Elliott et al. | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,614,781 B1 | 9/2003 | Elliott et al. | |
| 6,731,625 B1 | 5/2004 | Eastep et al. | |
| 6,732,156 B2 | 5/2004 | Miloslavsky | |

(Continued)

FOREIGN PATENT DOCUMENTS

GB  2 410 650 A  1/2005

(Continued)

*Primary Examiner*—William J Deane
(74) *Attorney, Agent, or Firm*—Husch Blackwell Sanders Welsh Katz

(57) ABSTRACT

A method and apparatus are provided for routing a SIP INVITE by a contact distributor that provides contact distribution services to a plurality of independent contact distribution services tenants. The method includes the steps of routing the SIP INVITE to a SIP proxy server of the contact distributor, the SIP proxy server identifying a tenant associated with the SIP INVITE of the plurality of independent contact distribution services tenants and the SIP proxy server routing the SIP INVITE to a resource of the contact distributor based upon the identified tenant.

31 Claims, 2 Drawing Sheets

U.S. PATENT DOCUMENTS

| | | |
|---|---|---|
| 6,754,181 B1 | 6/2004 | Elliott et al. |
| 6,788,779 B2 | 9/2004 | Ostapchuck |
| 6,831,966 B1 * | 12/2004 | Tegan et al. ............... 379/88.16 |
| 2004/0213209 A1 * | 10/2004 | O'Connor et al. ............ 370/352 |
| 2005/0238162 A1 * | 10/2005 | Dezonno ............... 379/265.09 |
| 2006/0245421 A1 * | 11/2006 | Ostapchuk .................. 370/352 |

FOREIGN PATENT DOCUMENTS

| | | |
|---|---|---|
| GB | 2 410 649 A | 8/2005 |

* cited by examiner

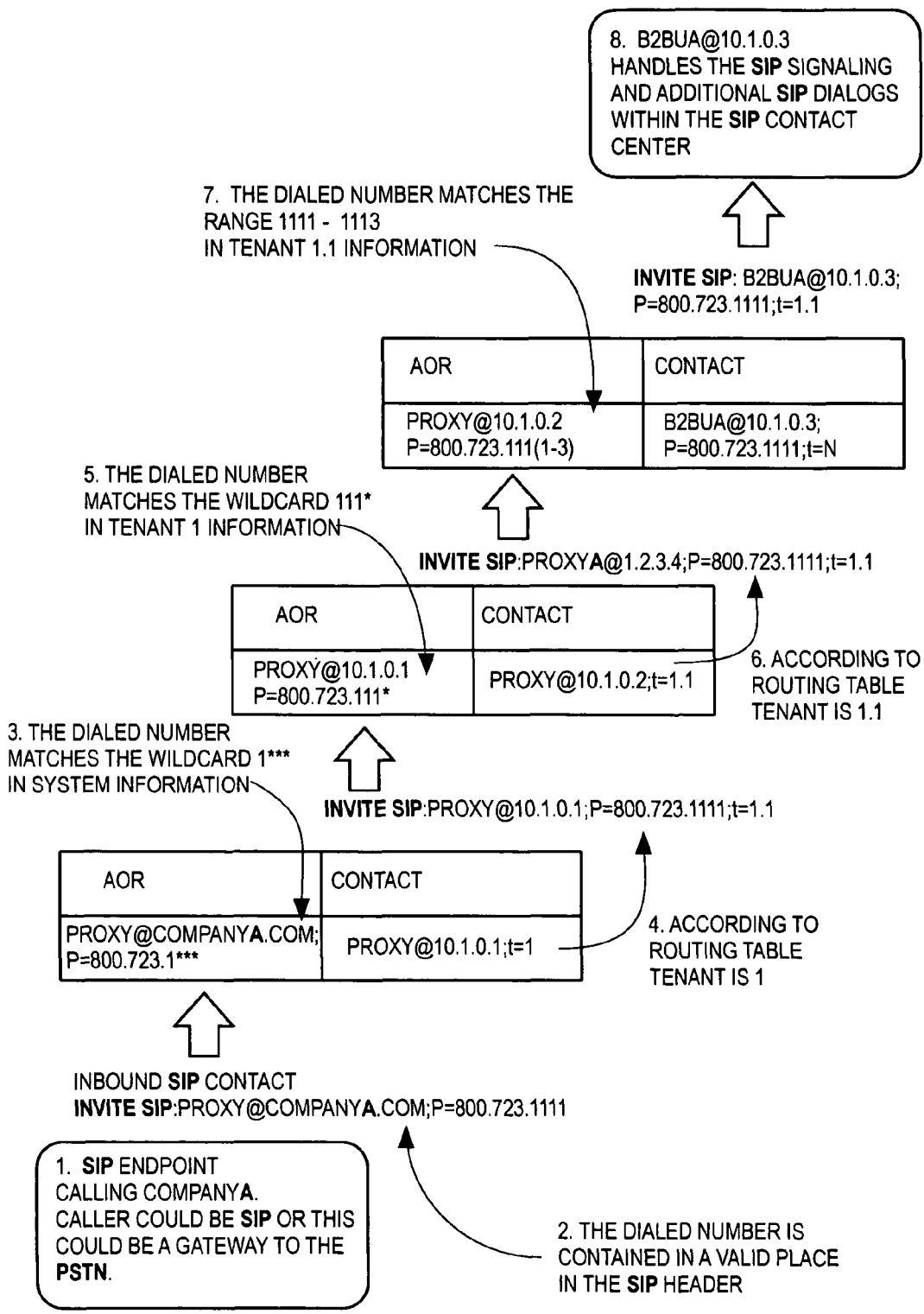

SIP ACD MULTI-TENANT MECHANISM THAT FACILITATES MULTIPLE LEVELS OF PARTITIONS OR TENANTS

FIELD OF THE INVENTION

The field of the invention relates to computer systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are expensive to obtain and operate. Even if an organization can afford an automatic call distributor, the organization must then hire and train agents who are capable of representing the organization in contacts with the organization's clients. Because of the importance of client relations, a need exists for a method of providing automatic call distribution services that does not involve the purchase of an automatic call distributor.

SUMMARY

A method and apparatus are provided for routing a SIP INVITE by a contact distributor that provides contact distribution services to a plurality of independent contact distribution services tenants. The method includes the steps of routing the SIP INVITE to a SIP proxy server of the contact distributor, the SIP proxy server identifying a tenant associated with the SIP INVITE of the plurality of independent contact distribution services tenants and the SIP proxy server routing the SIP INVITE to a resource of the contact distributor based upon the identified tenant.

BRIEF DESCRIPTION OF THE DRAWINGS

FIG. 2 depicts a contact routing process that may be used by the system of FIG. 1.

DETAILED DESCRIPTION OF AND ILLUSTRATED EMBODIMENT

Figure 1:
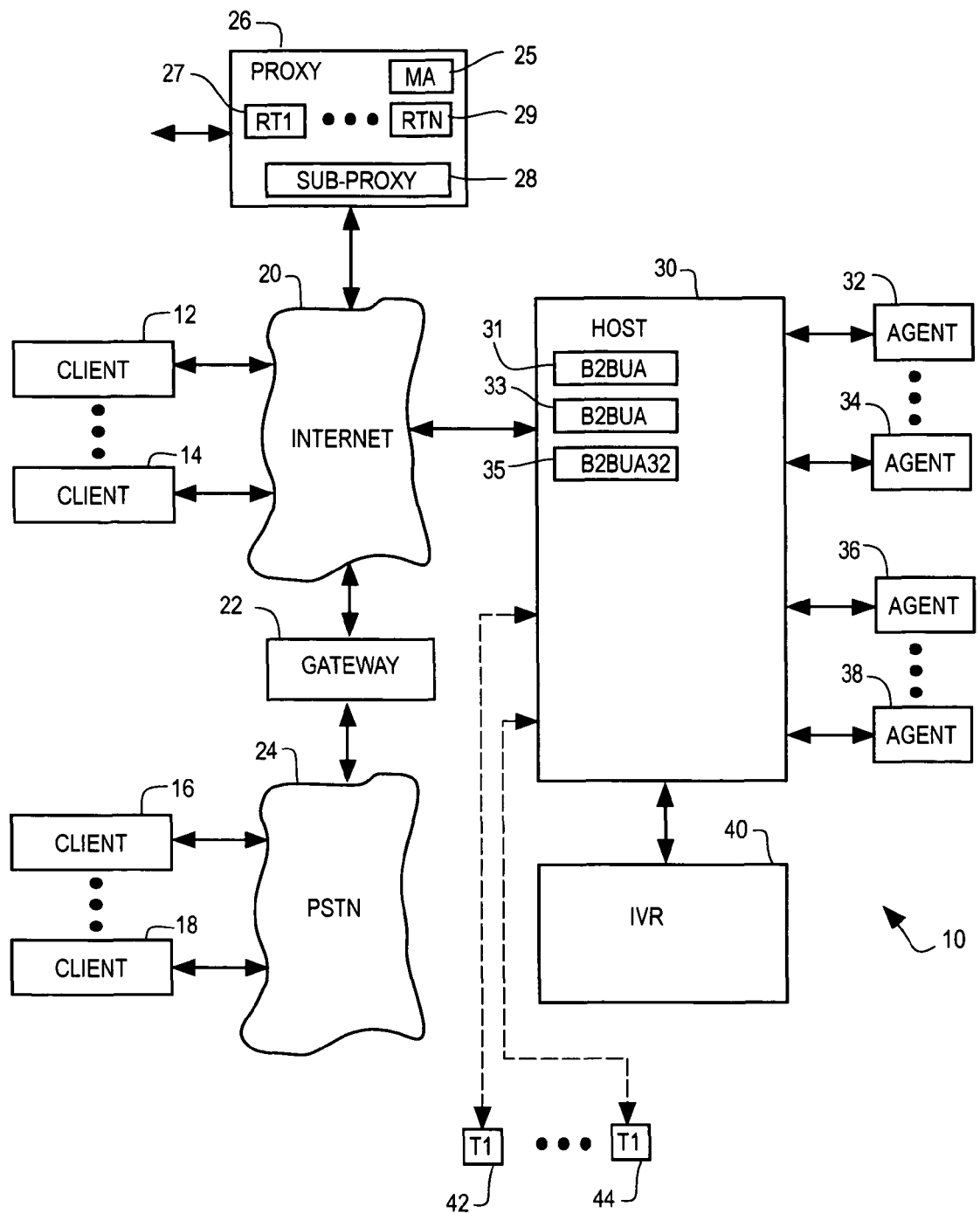
FIG. 1 is a block diagram of a contact distribution system in accordance with an illustrated embodiment of the invention.

FIG. 1 is a block diagram of a contact distribution system 10 shown under an illustrated embodiment of the invention. In general, the contact distribution system 10 may be owned and/or operated by a third-party service provider that provides communication services to organizations 42, 44 that subscribe (contract) for client support services and that, by operation of the contractual relationship, exist as tenants of the system 10.

The term "contact" is used throughout this description to indicate calls through the PSTN 24 and communication sessions through the Internet 20. In addition and as used herein, a contact distributor is a device that distributes contacts to one of a plurality of resources of the contact distributor based upon a set of business rules of one or more organizations using the contact distributor. A contact distributor is not a device that distributes contacts based upon a set of routing rules used by the PSTN or the Internet.

The contact distribution system may be used for connecting contacts through the Internet 20 between clients 12, 14, 16, 18 and agents 32, 34, 36, 38. Contacts handled through the Internet 20 may be processed under any appropriate format (e.g., e-mail, Instant Messaging (IM), chat, Voice-over-Internet-Protocol (VoIP), etc.). Similarly, voice-based contacts handled at least partially through the PSTN 24 and partially through the Internet 20 may be converted between a switched circuit format of the PSTN 24 and a VoIP format of the Internet 20 within a gateway 22.

Contacts between clients 12, 14, 16, 18 and the contact distribution system 10 may be set up and torn down using Session Initiation Protocol (SIP) as described by the Internet Engineering Task Force (IETF) RFC #3261. In this regard, a client 12, 14, using a SIP telephone, may dial a telephone number handled by the call distribution system 10 and the call may be routed to a resource of the system 10 through a proxy server 26 as described by IETF RFC #3261.

Similarly, a PSTN subscriber 16, 18 may dial that same number and the PSTN 24 will set up a switched circuit connection with the gateway 22. The gateway 22, in turn, will activate a VoIP application to service the call and route the contact to a resource of the contact distribution system 10 through the proxy server 26.

In general, the system 10 may be used by any of a number of different enterprise organizations (e.g., commercial, environmental, political, etc.) to advance the agenda of the enterprise. The organization may pay a monthly or per call fee to the third-party provider to handle contacts for the subscribing organization.

Each subscribing organization may contract with the third-party service provider to handle incoming and/or outgoing contacts. In the case of incoming contacts, the subscribing organizations may each possess one or more communication system addresses (e.g., telephone numbers, e-mail addresses, Universal Resource Locators (URLs), Universal Resource Indicators (URIs), etc.). For example, if the organization were to be a department store, then the organization may have a first telephone number for hardware and a second telephone number for appliances, etc.

The communication system addresses may be obtained separately by the subscribing organizations or addresses may be assigned to the organizations by the third-party service provider. Where addresses are obtained separately, the third-party services provider may simply arrange for incoming contacts to that system address to be routed to the contact distribution system 10.

The subscribing organizations may promulgate the agenda of the organization by placing ads in newspapers (or pop-up ads at certain websites) containing the system address of the organization. As contacts are detected by the system 10, the system 10 may recognize the target organization from contact associated information (e.g., DNIS where the call originates from within the PSTN 24, destination URL or URI if the call originates from within the Internet, etc.).

Once a call target is recognized, the system 10 may use a resource (e.g., agent, Interactive Voice Response Unit, etc.) of the system 10 to provide a presentation customized to the subscribing organization. As used herein, a resource of the contact distributor means a resource controlled by an organization that owns or operates the contact distribution system 10. A resource of the contact distributor is not a human subscriber of the public communication network.

For example, if the contact is routed to an agent 32, 34, 36, 38, the host 30 may cause a script to appear on a terminal of the agent answering the call that instructs the agent to answer the call with the name of the organization. Similarly, if the agents 32, 34, 36, 38 are busy, the host 30 may route the contact to the Interactive Voice Response Unit (IVR) 40 and cause the IVR 40 respond with a name of the organization and a set of options related to the organization.

In general, the responses provided by the resources 32, 34, 36, 38, 40 may be customized based upon the business rules of the organization. For example, a first subscribing organization (tenant of the system 10) may require special training for agents taking calls for the organization, but may allow any agent to take the contact after it has been waiting longer than some predetermined time period (e.g., 30 seconds). Another organization may require that only a predefined set of agents take calls for that organization.

In this regard, it may be assumed that a first set of agents 32, 34 handle calls for a first organizational tenant 42 and a second group of agents 36, 38 handle contacts for a second organization tenant 44. It may also be assumed that each tenant 42, 44 has provided a set of contact handling instructions to the host 30 that are incorporated into each call handling telescript of the system 10 based upon the tenant's business rules.

Turning now to the system 10, in specific, an explanation will be provided about how contacts are processed within the system 10. It may be noted first in this regard, that the system 10 may include the proxy server 26 described above that functions to identify and route calls. The proxy server 26 may operate generally as described by IETF RFC #3261 except as described below.

In general, the proxy server 26 may be identified to Internet users for purposes of routing calls based upon the use of a DNS query. When a SIP contact is initiated by a client 12 prior to any client specific handling, it is routed to the proxy server 26 whose purpose is to determine where to route the contact.

In order to perform this task, the proxy 26 uses one or more predefined routing tables 27, 29. The routing tables 27, 29 may be configured in any number of ways, including XML. Each record in the routing tables 27, 29 may include at least two fields. Both fields may contain valid SIP URIs (as currently defined by IETF RFC #3261). The first field may be a SIP Address of Record (AOR) and the second field may be a destination field (i.e., a URI of a destination specified by the business rules of the target organization 42, 44).

The proxy 26 may first obtain information about the SIP contact (i.e., the SIP INVITE) from various fields of the header of the SIP INVITE. The information of particular interest may be the originating party's telephone number (or other identification if the contact is an IM for example), or more likely, the called number (or intended destination address).

Once relevant information is obtained, the proxy 26 searches the routing table 27, 29 for an AOR with properties that match this information. The AOR may use wildcard values, regular expressions, or ranges so long as the format is that of a valid user parameter according to IETF RFC #3261 (or equivalent).

Once a match is made, the SIP contact is proxied (routed) using conventional SIP processes to the SIP entity specified in the destination field. The destination may be another SIP proxy 26 or a SIP User Agent (as defined by IETF RFC #3261) within the terminal of an agent 32, 34, 36, 38 or an IVR 40.

If the destination is another SIP proxy 26, then the routing process described above can be repeated, giving the mechanism described herein the ability to traverse multiple levels of tenants or partitions. The destination specified by the first proxy 26 can even be another location within the same proxy 26 or a different proxy 26. The process of matching the incoming SIP contact to a specific AOR in the routing table 27, 29 and then proxying to the specified destination URI repeats until the destination URI is a User Agent of an agent 32, 34, 36, 38 or IVR 40.

If the SIP entity specified by the destination URI in the routing table 27, 29 is a SIP User Agent, then the process described above will result in the contact (represented by the SIP INVITE) being accepted or rejected (as per IETF RFC #3261) by that User Agent. The User Agent can be part of a back-to-back User Agent (as defined by IETF RFC #3261) that will generate additional SIP dialogs, or it can be an endpoint such as a SIP telephone (e.g., agent 32, 34, 36, 38).

By way of example, it may be assumed that the client 12 dials a telephone number having the format 800-732-1XXX, where X could be any number. The example to be described below is shown graphically in FIG. 2.

Shown below are examples of first and second entries in the routing table 27, 29.

Proxy@CompanyA.com; p=800.732.1****, Proxy@10.1.0.1; t=1

Proxy@CompanyB.com; p=800.732.2****, Proxy@10.2.0.1; t=2

The entry found within the first field of the first entry "Proxy@CompanyA.com; p=800.732.1**" is the AOR and "Proxy@10.1.0.1; t=1" is the URI of the destination. In the above example, the information recovered from the SIP INVITE (i.e., the dialed telephone number) from the client 12 may be matched to the telephone number contained within the AOR of the first entry. In this example, the first entry of the first field "Proxy@CompanyA.com" is the URI of the system entity identified by the DNS query that is registered to receive calls directed to telephone number 800-732-1*.

It should be noted in this case, that the use of the asterisk "*" denotes any number. For example, if the client 12 had dialed any telephone number from 800-732-1000 to 800-732-1999 the contact would be routed to the proxy 26 and a first match would be made by a matching application 25 with the first entry shown above.

As mentioned above, the entry within the second field "Proxy@10.1.0.1; t=1" represents a destination URI of contacts directed to the AOR of the first entry. In this case, the contact is directed to another location within the proxy 26.

The entry "t=" is the field that identifies the tenant. In this case, the entry "t=1" identifies the call as being directed to the first tenant 42.

Shown below is another possible entry within the tables 27, 29. If the last four digits of the telephone number dialed by the client 12 was anywhere within the range of from 1110 to 1119, then the entry within the first field of the entry shown above may be matched to the entry shown below to form a second match in the routing process.

Proxy@10.1.0.1; p=800.732.111*, Proxy@10.1.0.2; t=1.1

As above, the asterisk represents any number from zero to nine.

The entry within the second field again routes the contact to another location within the proxy 26. The entry "t=1.1" represents a subtenant location.

Shown below is an entry in the table 27, 29 that may next be found to form a third match with the SIP INVITE.

Proxy@10.1.0.2; p=800.732.111[1-3], B2BUA@10.1.0.2; t=1.1

In this case, a match would be found if the last four digits were in the range of from 1111 to 1113.

The entry within the second field "B2BUA@10.1.0.2; t=1.1" may represent a URI of a back-to-back User Agent (B2BUA) 31 within the host 30. The matching of the SIP INVITE with the entry may cause the SIP INVITE to be transferred to the B2BUA 31.

The B2BUA 31 may be used to form the final connection between the client 12 and an agent (e.g., 32). The subtenant suffix "t=1.1" may be used to provide an indication to the B2BUA 31 about the identity of the tenant and of the type of call involved.

The B2BUA 31 may use the tenant identifier to identify the business rules to be applied to the process of the contact. The subtenant indicator "t=1.1 may be used as an indicator of the call type involved and the specific information that will be displayed on a terminal of the agent during handling of the contact.

In another embodiment, the entry below may have been present before the matching application 25 reached the entry of the third match. The entry shown below provides an alternate routing path in the event of a particular client 12 initiating the contact. The entry may be as follows.

Proxy@10.1.0.3; URI=client12@bthere.com, B2BUA@10.1.0.3; t=1.11

In this case, the matching application 25 may route the contact based upon the identity of the contact originator. For example, if the client 12 has a URI of client12@bthere.com, then the contact from the client 12 may be routed to a B2BUA 35 that sends the SIP INVITE to a predetermined agent 38. In this case, the routing of the contact from the client 12 to the agent 38 may be based upon a business rule that all contacts from the client 12 must be routed to the agent 38.

In another example, instead of dialing a number 800-732-1XXX, the client 12 may have dialed a number having the format 800-732-2XXX, where X again indicates any number. In this case, the dialed number may be matched with the entry shown below.

Proxy@CompanyB.com; p=800.732.2****, Proxy@10.2.0.1; t=2

In this case, the URI in the second field may be matched with the entry shown below.

Proxy@10.2.0.1; p=800.732.222*, B2BUA@10.2.0.1; t=2

In this case, the URI "B2BUA@10.2.0.1; t=2" may cause the SIP INVITE to be routed to the B2BUA 33. As above, the tenant indicator "t=2" provides a call type indicator.

In addition to the use of telephone numbers, the proxy server 26 may also use source identifiers and other entries within the first fields of the tables 27, 29 to make further decisions as to the type of call involved. In this case, if the source identifier indicated an existing client, then the routing tables 27, 29 may be used to route a contact to a particular agent or group of agents.

A specific embodiment of method and apparatus for routing contacts has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of routing a SIP INVITE by a single contact distributor that provides contact distribution services to each of a plurality of independent contact distribution services tenants who have subscribed with the contact distributor for client support services, such method comprising the steps of:
   routing the SIP INVITE to a SIP proxy server of the contact distributor;
   the SIP proxy obtaining information about the SIP INVITE from a header of the SIP INVITE including tenant identifying information;
   the SIP proxy server identifying a tenant uniquely associated with the SIP INVITE of the plurality of independent contact distribution services tenants by searching a routing table, the table having a SIP Address of Record field and an associated destination field containing a destination address associated with one of the plurality of tenants, for an Address of Record that matches the SIP INVITE tenant identifying information; and
   the SIP proxy server routing the SIP INVITE to a destination resource of the contact distributor based upon the identified tenant and the associated destination field.

2. The method of routing a SIP INVITE as in claim 1 wherein the step of identifying the tenant further comprises matching a field of the SIP INVITE with a content of a lookup table based upon at least one of source information and destination information within the SIP INVITE header.

3. The method of routing a contact as in claim 1 wherein the destination resource is a proxy server which identifies a sub tenant destination address associated with the identified tenant and which routes the SIP INVITE thereto.

4. The method of routing a contact as in claim 3 wherein the step of identifying the tenant further comprises comparing an addressee field of the SIP INVITE with a group of addresses assigned to the tenant and determining that the addressee field of the SIP INVITE is included within the group.

5. The method of routing a contact as in claim 1 wherein the step of routing the SIP INVITE to the resource of the contact distributor further comprises routing the SIP INVITE to an agent of the contact distributor.

6. The method of routing a contact as in claim 1 wherein the step of routing the SIP INVITE to the resource of the contact distributor further comprises routing the SIP INVITE to an automatic voice response unit of the contact distributor.

7. The method of routing a contact as in claim 1 wherein the step of routing the SIP INVITE to a resource of the contact distributor further comprises routing the SIP INVITE to a sub-tenant proxy server of the contact server user.

8. The method of routing a contact as in claim 7 further comprising determining a contact type within the sub-tenant server.

9. The method of routing a contact as in claim 8 wherein the step of determining a contact type within the sub-tenant server further comprises matching a field of a SIP INVITE with an entry of a sub-tenant lookup table.

10. The method of routing a contact as in claim 8 wherein the step of matching a field of a SIP INVITE with an entry of a sub-tenant lookup table further comprises matching a addressee field of the SIP INVITE with entries of the sub-tenant lookup table.

11. The method of routing a contact as in claim 8 wherein the step of matching a field of a SIP INVITE with an entry of a sub-tenant lookup table further comprises matching a source field of the SIP INVITE with entries of the sub-tenant lookup table.

12. An apparatus for routing a SIP INVITE within a contact distributor that provides contact distribution services to each of a plurality of independent contact distribution services tenants who have subscribed with the contact distributor for client support services, such apparatus comprising:
    means for routing the SIP INVITE to a SIP proxy server of the contact distributor;
    means within the SIP proxy server for obtaining source information about the SIP INVITE source from a header of the SIP INVITE including tenant identifying information;
    means within the SIP proxy server for identifying a tenant uniquely associated with the SIP INVITE of the plurality of independent contact distribution services tenants by searching a routing table, the table having a SIP Address of Record field and an associated destination field for each record, for an address of record that matches the source SIP INVITE tenant identifying information; and
    means within the SIP proxy server for routing the SIP INVITE to a destination resource of the contact distributor based upon the identified tenant and the associated destination field.

13. The apparatus for routing a SIP INVITE as in claim 12 wherein the means for identifying the tenant further comprises means for matching a field of the SIP INVITE with a content of a lookup table.

14. The apparatus for routing a contact as in claim 13 wherein each tenant of the plurality of tenants has a different address of record, and wherein the destination resource is a proxy server which identifies a sub-tenant destination address associated with the identified tenant and which routes the SIP INVITE thereto.

15. The apparatus for routing a contact as in claim 14 wherein the means for identifying the tenant further comprises means for comparing an addressee field of the SIP INVITE with a group of addresses assigned to the tenant and determining that the addressee field of the SIP INVITE is included within the group.

16. The apparatus for routing a contact as in claim 12 wherein means for of routing the SIP INVITE to the resource of the contact distributor further comprises means for routing the SIP INVITE to an agent of the contact distributor.

17. The apparatus for routing a contact as in claim 12 wherein the means for routing the SIP INVITE to the resource of the contact distributor further comprises means for routing the SIP INVITE to an automatic voice response unit of the contact distributor.

18. The apparatus for routing a contact as in claim 12 wherein the means for routing the SIP INVITE to a resource of the contact distributor further comprises means for routing the SIP INVITE to a sub-tenant proxy server of the contact server user.

19. The apparatus for routing a contact as in claim 18 further comprising means for determining a contact type within the sub-tenant server.

20. The apparatus for routing a contact as in claim 19 wherein the means for determining a contact type within the sub-tenant server further comprises means for matching a field of a SIP INVITE with an entry of a sub-tenant lookup table.

21. The apparatus for routing a contact as in claim 19 wherein the means for matching a field of a SIP INVITE with an entry of a sub-tenant lookup table further comprises means for matching a addressee field of the SIP INVITE with entries of the sub-tenant lookup table.

22. The apparatus for routing a contact as in claim 19 wherein the means for matching a field of a SIP INVITE with an entry of a sub-tenant lookup table further comprises means for matching a source field of the SIP INVITE with entries of the sub-tenant lookup table.

23. An apparatus for routing a SIP INVITE within a contact distributor that provides contact distribution services to each of a plurality of independent contact distribution services tenants who have subscribed with the contact distributor for client services, such apparatus comprising:
    a SIP proxy server that obtains information about the SIP INVITE from a header of the SIP INVITE including tenant identifying information that uniquely identifies a tenant associated with the SIP INVITE of the plurality of independent contact distribution services tenants; and
    a lookup table within the SIP proxy server, having a SIP Address of Record field and an associated destination field associated with the of the plurality of tenants, and tenant field identifying the associated tenant, for matching the obtained SIP INVITE tenant identifying information with an Address of Record and for routing the SIP INVITE to a destination resource of the contact distributor based upon the identified tenant and the destination field associated with the matched Address of Record.

24. The apparatus for routing a SIP INVITE as in claim 23 wherein the lookup table further comprises a first entry having a first field with an address of record that contains a communication system address associated with the tenant.

25. The apparatus for routing a SIP INVITE as in claim 24 wherein the first entry further comprises a second field with a Universal Resource Indicator of a destination for the SIP INVITE.

26. The apparatus for routing a SIP INVITE as in claim 25 wherein the destination Universal Resource Indicator of first entry further comprises a second entry within the lookup table.

27. The apparatus for routing a SIP INVITE as in claim 24 wherein the second entry further comprises a first field with a call type identifier that matches a characteristic of the SIP INVITE.

28. The apparatus for routing a SIP INVITE as in claim 24 wherein the second entry further comprises a second field with a Universal Resource Indicator of a User Agent of the resource.

29. The apparatus for routing a SIP INVITE as in claim 28 wherein the User Agent further comprises an application within a terminal of an agent of the contact distributor.

30. The apparatus for routing a SIP INVITE as in claim 28 wherein the User Agent further comprises an application within an Interactive Voice Response unit of the contact distributor.

31. A method of routing a contact within a contact services provider that provides contact services to each of a plurality of independent contact service users, such method comprising the steps of:

routing the contact to a SIP proxy server, the contact having a SIP INVITE including a header with information about the SIP INVITE including contact service user identifying information;

detecting a type of the contact that is to be directed to a contact service user of the plurality of contact service users within the proxy server based upon a content of the contact by searching a routing table, the routing table having a SIP Address of Record field and an associated destination field and an associated contact type indicator, for an Address of Record that matches the SIP INVITE contact service user information and determining the contact type based on the associated contact type indicator; and routing the contact based upon the detected type of contact.

* * * * *